Jan. 9, 1968   R. G. BALDWIN ET AL   3,362,231
CONTROL APPARATUS
Filed Sept. 10, 1965
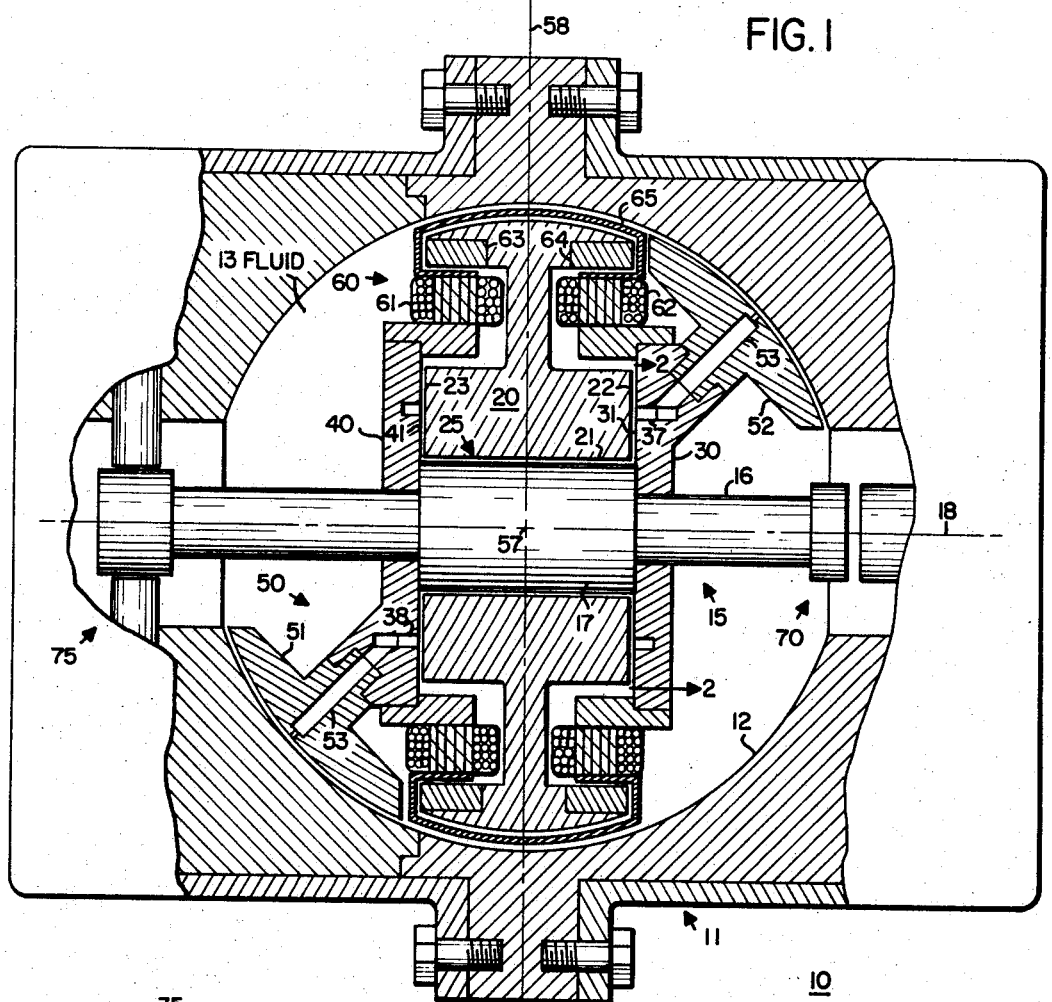
FIG. I
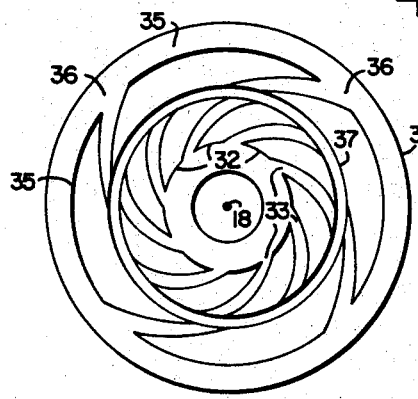
FIG. 2
INVENTORS
ROLLAND G. BALDWIN
GOFFE. J. ERICKSON
STAN J. KORZENOWSKI
BY *Ronald T. Reiling*
ATTORNEY 3,362,231
CONTROL APPARATUS
Rolland G. Baldwin, Goffe J. Erickson, and Stan J. Korzenowski, Minneapolis, Minn., assignors to Honeywell Inc., Minneapolis, Minn., a corporation of Delaware
Filed Sept. 10, 1965, Ser. No. 486,407
6 Claims. (Cl. 74—5)

This invention pertains to a two axis gyroscope and to fluid suspension means therefor. The fluid suspension means has utility in applications other than a gyroscope. The fluid suspension means includes self contained hydrostatic bearing means for supporting the gimbal element and hydrodynamic bearing means for supporting the rotor member. The hydrodynamic bearing means is operable, upon rotation of the rotor element, to provide radial support of the rotor element relative to a first axis. The hydrodynamic bearing means also includes a first and second thrust or support pad each having a first and second plurality of grooves therein. The rotor member, upon rotation thereof, co-acts with the first plurality of grooves in the thrust pads so as to provide axial support of the rotor member relative to the first axis. The rotor member, upon rotation thereof, also co-acts with the second plurality of grooves in the thrust pads so as to develop a viscous pumping action to provide the required pressure and flow to the hydrostatic bearing means to support the gimbal element relative to a second and third axis. It is clear that the hydrostatic bearing means is entirely self contained. Thus the fluid suspension means functions to support a member for rotary movement relative to a plurality of axes. The utilization of this fluid suspension means in a gyroscope results in a low cost, two degree of freedom, non-floated gyro capable of precise inertial grade performance. The fluid suspension system provides long life and high reliability.

FIGURE 1 is a partial cross-section view of a gyroscope utilizing the fluid suspension means; and FIGURE 2 is a cross-sectional view taken along line 2—2 of FIGURE 1.

Referring now to FIGURE 1, reference numeral 10 depicts a two degree of freedom gyroscope. A housing means 11 is provided having a substantially spherical chamber 12 therein. Fluid means 13 are provided within chamber 12.

A gimbal element 15 is located within chamber 12. Gimbal element 15 includes a cylindrical shaft 16 having an enlarged central portion 17. Shaft 16 has a longitudinal axis identified by reference numeral 18. An annular rotor member 20 having a central aperture 21 therethrough surrounds enlarged portion 17 of shaft 16 and is spaced apart therefrom. Enlarged portion 17 and aperture 21 cooperate to form a hydrodynamic journal bearing 25 that radially supports rotor member 20 relative to axis 18.

Rotor member 20 has a plane surface 22 and 23 at each end thereof. A first thrust or support pad 30 having a plane surface 31 thereon is rigidly attached to shaft 16 with surface 31 substantially perpendicular to axis 18 and spaced apart from surface 22 of rotor member 20. As illustrated in FIGURE 2, surface 31 of support pad 30 has a first plurality of spiral grooves 32 therein equally angularly spaced about axis 18. Between each spiral groove 32 is a land portion 33. In the particular embodiment illustrated, the depth of grooves 32 is .0001 inch, the spiral angle is 70 degrees and the land to groove ratio is relatively high, 2. These characteristics are designed to give a high thrust axial support of rotor 20 relative to axis 18. Surface 31 of support pad 30 has a second plurality of grooves 35 therein equally angularly spaced about axis 18 and concentric with grooves 32. Intermediate grooves 35 is a land portion 36. In the specific embodiment illustrated, grooves 35 have a depth of .0006 inch, a spiral angle of 72 degrees, and a low land-to-groove ratio of .25. These characteristics provide an efficient viscous pumping action. Surface 31 is spaced apart from surface 23 of rotor member 20 a distance of .0001 inch. An annular channel 37 is located in surface 31 between grooves 32 and 35 in communication therewith. Channel 37 functions as a manifold in a manner to be explained hereinafter.

A second thrust or support pad 40 having a plane surface 41 thereon is rigidly attached to shaft 16 with surface 41 in opposed relationship with surface 31, and substantially perpendicular to axis 18. Surface 41 is spaced apart from surface 23 of rotor member 20 a distance of .0001 inch. Support pad 40 is identical to support pad 30 and has a third and fourth plurality of grooves therein angularly spaced about axis 18 and an annular channel 38 therebetween.

Hydrostatic bearing means 50 are provided for supporting gimbal element 15 within chamber 12 of housing means 11. Hydrostatic bearing means 50 includes a plurality of hydrostatic bearing pads such as 51 and 52. In the specific embodiment illustrated, a total of six hydrostatic bearing pads are utilized. Each bearing pad is in fluid communication with either annular channel 37 of support pad 30 or annular channel 38 of support pad 40, through suitable passage means 53. Hydrostatic bearing means 50 is operable to support gimbal 15 for rotary movement about three intersecting axes, for example, axes 18, 57, and 58.

Means 60 are provided for rotating rotor member 20 about axis 18 relative to support pads 30 and 40. Means 60 include stator windings 61 and 62 attached to support pads 30 and 40 and hysteresis rings 63 and 64 attached to rotor member 20. Windings 61 and 62 coact with hysteresis rings 63 and 64 respectively to rotate rotor member 20 at a substantially constant angular velocity about axis 18. Stator windings 61 and 62 are connected to a source of electrical energy through suitable flex leads (not shown). A rotor shield 65 surrounds rotor member 20 and reduces the windage effects thereon.

A signal generator or optical pickoff means 70 is provided to sense the rotary movement of gimbal 15 about axis 57 and 58 relative to a normal position and to provide an output signal indicative of the direction and magnitude thereof. Signal generator means 70 forms no part of the present invention and need not be described in detail. The signal from signal generator means 70 is conveyed to a permanent magnet torque generator 75. Torque generator 75 is operable to exert a force on gimbal element 15 tending to rebalance the rotary movement of the gimbal element about axes 57 and 58. Torque generator 75 forms no part of the present invention and need not be described in detail.

In operation, means 60 for rotating rotor member 20 is energized from a source of electrical energy causing rotor member 20 to rotate at a substantially constant angular velocity about axis 18 relative to shaft 16 and relative to support pads 30 and 40. The relative movement between rotor member 20 and portion 17 of shaft 16 results in hydrodynamic radial support of rotor member 20 relative to axis 18 by hydrodynamic journal bearing means 25 in manner well known to those skilled in the art. The relative movement between rotor member 20 and grooves 32 in support pad 30 and the relative movement between rotor member 20 and the third plurality of grooves in support pad 40 results in hydrodynamic axial (thrust) support of rotor member 20 relative to axis 18 in a manner well known to those skilled in the art. The relative movement between rotor member 20 and grooves 35 in support pad 30 and the corresponding grooves in support pad 40 results in a viscous pumping action which provides a relatively high pressure fluid in channel 37 and channel 38 in a manner well known to those skilled in the art. The required fluid pressure and flow is conveyed from channel 37 and channel 38 to the hydrostatic bearing pads so as to support gimbal element 15 for rotary movement about axes 57 and 58. The rotary movement of gimbal 15 about axes 57 and 58 from a normal position is detected by signal generator means 70. Signal generator means 70 provides an output signal indicative of the magnitude and direction of the rotary movement of gimbal element 15 from a normal position. This output signal is conveyed to torque generator means 75 which exerts a force upon gimbal element 15 tending to rebalance the rotary movement of gimbal element 15.

Thus the applicant has provided a unique, low-cost two axis gyroscope and a self-contained fluid suspension means therefor. The rotor member is hydrodynamically supported radially and axially. The rotor member also functions as a viscous pump so as to provide the required fluid pressure and flow to the hydrostatic bearing means for supporting the gimbal element relative to a plurality of axes.

While we have shown and described a specific embodiment of this invention, further modification and improvements will occur to those skilled in the art. We desire to be understood, therefore, that this invention is not limited to the particular form shown and we intend in the appended claims to cover all modifications which do not depart from the spirit of the scope of this invention.

What we claim is:
1. A two degree of freedom gyroscope comprising:
 housing means;
 fluid means within said housing means;
 a gimbal element;
 a rotor member;
 hydrodynamic journal bearing means supporting said rotor element upon said gimbal element for rotary movement about a first axis;
 a first support pad having a first plane surface thereon, said first support pad being rigidly attached to said gimbal element with said first plane surface substantially perpendicular to said first axis and spaced apart from said rotor member, said first plane surface having a first plurality of grooves therein angularly spaced about said first axis, said first plane surface having a second plurality of grooves therein angularly spaced about said first axis concentric with said first plurality of grooves;
 a second support pad having a second plane surface thereon, said second support pad being rigidly attached to said gimbal element with said second plane surface in opposed relationship with said first plane surface, said second plane surface being substantially perpendicular to said first axis spaced apart from said rotor member, said second plane surface having a third plurality of grooves therein angularly spaced about said first axis, said second plane surface having a fourth plurality of grooves therein angularly spaced about said first axis concentric with said third plurality of grooves;
 hydrostatic bearing means for supporting said gimbal element within said housing means for rotary movement about a second and a third axis, said hydrostatic bearing means being in communication with said first and third plurality of grooves;
 means for rotating said rotor member about said first axis relative to said first and second support pads whereby said first and third plurality of grooves coact with said rotor member to provide axial support of said rotor member relative to said first axis, said second and fourth plurality of grooves coacting with said rotor member upon relative movement therebetween to provide fluid pressure and flow to said hydrostatic bearing means;
 signal generator means for sensing the rotary movement of said gimbal element relative to said housing means about said second and said third axis; and
 torque generator means for exerting a force on said gimbal element tending to rebalance the rotary movement of said gimbal element.

2. A two degree of freedom gyroscope comprising:
 housing means;
 fluid means within said housing means;
 a gimbal element;
 a rotor member;
 hydrodynamic journal bearing means supporting said rotor element upon said gimbal element for rotary movement about a first axis;
 a first pad rigidly attached to said gimbal and spaced apart from said rotor member, said first pad having a first plurality of grooves therein angularly spaced about said first axis, said first support pad having a second plurality of grooves therein angularly spaced about said first axis coaxial with said first plurality of grooves;
 a second pad rigidly attached to said gimbal in opposed relationship with said first pad and spaced apart from said rotor member, said second pad having a third plurality of grooves therein angularly spaced about said first axis, said second pad having a fourth plurality of grooves therein angularly spaced about said first axis coaxial with said third plurality of grooves;
 hydrostatic bearing means for supporting said gimbal element within said housing means for rotary movement about a second and third axis, said hydrostatic bearing means being in communication with said second and fourth plurality of grooves;
 means for rotating said rotor element about said first axis relative to said first and second pads whereby said first and said third plurality of grooves coact with said rotor member to provide axial support of said rotor member relative to said first axis, said second and said fourth plurality of grooves coacting with said rotor member upon relative movement therebetween to provide fluid pressure and flow to said hydrostatic bearing means;
 signal generator means for sensing the rotary movement of said gimbal element relative to said housing means about said second and said third axis; and
 torque generator means for exerting a force on said gimbal element tending to rebalance the rotary movement of said gimbal element.

3. A two degree of freedom gyroscope comprising:
 housing means;
 fluid means within said housing means;
 a gimbal element;
 a rotor member;
 hydrodynamic journal bearing means supporting said rotor member upon said gimbal element for rotary movement about a first axis;
 a first and a second pad attached to said gimbal, each pad having a first plurality and a second plurality of grooves therein, each pad being spaced apart from and contiguous with said rotor element;
 hydrostatic bearing means for supporting said gimbal element within said housing means for rotary movement about a second and a third axis, said hydrostatic bearing means being in communication with said second plurality of grooves;
 means for rotating said rotor element about said first axis relative to said first and second pads whereby said first plurality of grooves coact with said rotor to provide axial support of said rotor member relative to said first axis and said second plurality of grooves coact with said rotor member to provide fluid to said hydrostatic bearing means; and
 signal generator means for sensing the rotary movement of said gimbal element relative to said housing means about said second and said third axis.

4. Fluid suspension means for supporting a member within a housing for rotary movement relative thereto about a plurality of axes comprising:
   fluid means within said housing;
   a cylindrical shaft having a longitudinal axis, said member surrounding said shaft and spaced apart therefrom;
   a first support pad having a first plane surface thereon, said first support pad being rigidly attached to shaft with said first plane surface substantially perpendicular to said longitudinal axis and spaced apart from said member, said first plane surface having a first plurality of grooves therein angularly spaced about said longitudinal axis and having a relatively high land to groove ratio, said first plane surface having a second plurality of grooves therein angularly spaced about said longitudinal axis and having a relatively low land to groove ratio;
   a second support pad having a second plane surface thereon, said second support pad being rigidly attached to said shaft with said second plane surface in opposed relationship with said first plane surface, said second plane surface being substantially perpendicular to said longitudinal axis spaced apart from said member, said second plane surface having a third plurality of grooves therein angularly spaced about said longitudinal axis and having a relatively high land to groove ratio, said second plane surface having a fourth plurality of grooves therein angularly spaced about said longitudinal axis having a relatively low land to groove ratio;
   hydrostatic bearing means including a plurality of hydrostatic bearing pads rigidly attached to said shaft, at least one of said bearing pads being in communication with said second plurality of grooves and at least one of said bearing pads being in communication with said fourth plurality of grooves; and
   means for rotating said member about said longitudinal axis so as to provide relative movement between said member and said shaft and between said member and said first and second support pads, relative movement between said member and said shaft being effective to provide hydrodynamic radial support of said member relative to said longitudinal axis, relative movement between said member and said first and third plurality of grooves being effective to provide hydrodynamic axial support of said member relative to said longitudinal axis, and relative movement between said member and said second and fourth plurality of grooves being effective to pump fluid to said plurality of hydrostatic bearing pads so as to support said member for rotary movement about a second and a third axis relative to said housing.

5. Fluid suspension means for supporting a member within a housing for rotary movement relative thereto about a plurality of axes comprising:
   fluid means within said housing;
   hydrodynamic journal bearing means for supporting said member within said housing for rotation about a first axis, said journal bearing means including a shaft;
   a first pad rigidly attached to said shaft and spaced apart from said member, said first pad having a first and a second plurality of grooves therein angularly spaced about said first axis;
   a second pad rigidly attached to said shaft in opposed relationship with said first pad and spaced apart from said member, said second pad having a third and a fourth plurality of grooves therein angularly spaced about said first axis;
   hydrostatic bearing means attached to said shaft and in communication with said second and said fourth plurality of grooves; and
   means for rotating said member about said first axis so as to provide relative movement between said member and said shaft and between said members and said first and second pad, relative movement between said shaft and said member being effective to provide hydrodynamic radial support of said member relative to said first axis, relative movement between said member and said first and third plurality of grooves being effective to provide hydrodynamic axial support of said member relative to said first axis, and relative movement between said member and said second and fourth plurality of grooves being effective to provide fluid to said plurality of hydrostatic bearing means so as to support said member for rotary movement about a second axis.

6. A fluid suspension means for supporting a member within a housing for rotary movement relative thereto about a plurality of axes comprising:
   hydrodynamic journal bearing means for supporting said member for rotation about a first axis;
   a first pad within said housing spaced apart from said member, said first pad having a first and a second plurality of grooves therein;
   a second pad within said housing in opposed relationship with said first pad and spaced apart from said member, said second pad having a third and a fourth plurality of grooves therein;
   hydrostatic bearing means attached to said support pads, said hydrostatic bearing means being in communication with said second and said fourth plurality of grooves;
   means for rotating said member about said first axis so as to provide relative movement between member and said grooves, the relative movement between said member and said first and third plurality of grooves being effective to provide hydrodynamic axial support of said member relative to said first axis and the relative movement between said member and said second and fourth plurality of grooves being effective to provide fluid to said hydrostatic bearing means so as to support said member for rotary movement about a second axis relative to said housing.

References Cited
UNITED STATES PATENTS

| | | | |
|---|---|---|---|
| 2,915,902 | 12/1959 | Brugger | 74—5 |
| 3,242,742 | 3/1966 | Parker. | |
| 3,267,744 | 8/1966 | Baldwin et al. | 74—5 |

FRED C. MATTERN, Jr. *Primary Examiner.*

C. J. HUSAR, *Assistant Examiner.*